United States Patent
Andersson

(10) Patent No.: US 11,054,903 B2
(45) Date of Patent: Jul. 6, 2021

(54) METHOD, EYETRACKER AND COMPUTER PROGRAM FOR DETERMINING EYE POSITIONS IN DIGITAL IMAGE DATA

(71) Applicant: Tobii AB, Danderyd (SE)

(72) Inventor: Richard Andersson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/914,261

(22) Filed: Jun. 26, 2020

(65) Prior Publication Data
US 2021/0011551 A1  Jan. 14, 2021

(30) Foreign Application Priority Data
Jun. 26, 2019  (SE) .................................. 1950791-2

(51) Int. Cl.
*G06F 3/01* (2006.01)
*G06K 9/00* (2006.01)
*G06K 9/20* (2006.01)

(52) U.S. Cl.
CPC .......... *G06F 3/013* (2013.01); *G06K 9/0061* (2013.01); *G06K 9/00604* (2013.01); *G06K 9/2027* (2013.01)

(58) Field of Classification Search
CPC .. G06F 3/013; G06K 9/0061; G06K 9/00604; G06K 9/2027
See application file for complete search history.

(56) References Cited

U.S. PATENT DOCUMENTS

| | | | |
|---|---|---|---|
| 2003/0012413 A1* | 1/2003 | Kusakari | G06K 9/00604 382/117 |
| 2011/0249237 A1* | 10/2011 | Chernyak | A61B 3/11 351/206 |
| 2013/0331729 A1* | 12/2013 | de Lemos | A61B 5/1104 600/558 |
| 2014/0289834 A1* | 9/2014 | Lindemann | H04W 12/065 726/7 |
| 2016/0267875 A1* | 9/2016 | Weindorf | G09G 5/00 |
| 2019/0282086 A1* | 9/2019 | Cohen | A61B 3/112 |

FOREIGN PATENT DOCUMENTS

CN  103544420 A  *  1/2014

* cited by examiner

*Primary Examiner* — Abhishek Sarma
(74) *Attorney, Agent, or Firm* — Samuel I. Yamron

(57) ABSTRACT

An eyetracker obtains a digital image representing at least one eye of a subject. The eyetracker then searches for pupil candidates in the digital image according to a search algorithm and, based on the searching, determines a position for the at least one eye in the digital image. The eyetracker also obtains light-intensity information expressing an estimated amount of light energy exposing the at least one eye when registering the digital image. In response to the light-intensity information, the eye-tracker determines a range of pupil sizes. The search algorithm applies the range of pupil sizes in such a manner that a detected pupil candidate must have size within the range of pupil sizes to be accepted by the search algorithm as a valid pupil of the subject.

20 Claims, 4 Drawing Sheets

METHOD, EYETRACKER AND COMPUTER PROGRAM FOR DETERMINING EYE POSITIONS IN DIGITAL IMAGE DATA

CROSS REFERENCE TO RELATED APPLICATIONS

This application claims priority to Swedish Application No. 1950791-2, filed Jun. 26, 2019; the content of which are hereby incorporated by reference.

TECHNICAL FIELD

The invention relates generally to efficient handling of gaze data. In particular, the present invention concerns a method performed in an eyetracker, an eyetracker, a headset and an eye-tracker arrangement configured to present visual information to a subject via a display being physically separated from the subject. The invention also relates to a computer program product and a non-volatile data carrier.

BACKGROUND

Eye/gaze tracking is the process of measuring the motion of an eye relative to the head, or the point of gaze. An eyetracker is a device for measuring eye positions and eye movement. Eyetrackers are used in many different applications. There are various methods for measuring eye movement. The most popular variant uses video images from which the eye position is extracted. Other methods use search coils, or are based on the electrooculogram. Originally, eyetracking technology was used in research on the visual system, in psychology, in psycholinguistics, marketing and in product design. Today, we see an increasing use of eyetrackers as input devices for human-computer interaction in various kinds of devices and apparatuses ranging from smart-phones to aircrafts. To enable processing efficient eyetracking in consumer products it is important that the tracking algorithm is capable of identifying a subject's pupil in simple and yet reliable manner. Below follows examples of known eyetracking solutions.

US 2018/0300589 relates to hybrid eye center localization using machine learning, namely cascaded regression and handcrafted model fitting to improve a computer. Systems and methods of eye center (iris) detection are proposed, which use a cascade regressor (cascade of regression forests) as well as systems and methods for training a cascaded regressor. The eyes are detected using a facial feature alignment method. The robustness of localization is improved by using both advanced features and powerful regression machinery. Localization is made more accurate by adding a robust circle fitting post-processing step. There is also provided a method to train the cascaded regressor without the need for manually annotated training data using a simple hand-crafted method for eye center localization.

US 2015/0160726 describes a system and a method for performing eye gaze tracking. The system is configured for and the method comprises optimizing illumination of a scene for a single on-axis imaging apparatus, capturing an image using the single on-axis imaging apparatus under the optimized illumination, and processing the captured image to perform a gaze estimation. Dynamic illumination control, eye candidate detection and filtering, and gaze estimation techniques are also provided.

US 2015/0098620 discloses hybrid eye center localization using machine learning, namely cascaded regression and handcrafted model fitting to improve a computer. There are proposed systems and methods of eye center (iris) detection using a cascade regressor (cascade of regression forests) as well as systems and methods for training a cascaded regressor. The eyes are detected using a facial feature alignment method. The robustness of localization is improved by using both advanced features and powerful regression machinery. Localization is made more accurate by adding a robust circle fitting post-processing step. Finally, using a simple hand-crafted method for eye center localization, there is provided a method to train the cascaded regressor without the need for manually annotated training data.

These known solutions may provide reliable eyetracking. However, they all involve highly complex algorithms that require relatively large processing resources. This, in turn, translates into energy consumption.

SUMMARY

One object of the present invention is therefore to offer a solution for reliable eyetracking in an energy-efficient manner.

According to one aspect of the invention, this object is achieved by a method performed in an eyetracker, which method involves the steps of: obtaining a digital image representing at least one eye of a subject, searching for pupil candidates in the digital image according to a search algorithm, and determining a position for the at least one eye in the digital image based on said searching. The method further involves obtaining light-intensity information expressing an estimated amount of light energy exposing the at least one eye when registering the digital image. In response to the light-intensity information, a range of pupil sizes is determined. This range is applied by the search algorithm in such a manner that the size of a detected pupil candidate must lie within the range in order to be accepted by the search algorithm as a valid pupil of the subject.

This method is advantageous because it effectively limits the potential pupil candidates to a very small number, typically one or two per image frame. As a result, the processing resources can be economized in the subsequent tracking procedure.

According to one embodiment of this aspect of the invention, the determining of the range of pupil sizes involves using an eye model that defines the range of pupil sizes based on the light-intensity information. Preferably, the eye model that defines the range of pupil sizes is based on at least one parameter describing a pupil behavior in response to variations in the estimated amount of light energy exposing the at least one eye. Thereby, the pupil size can be predicted accurately.

According to another embodiment of this aspect of the invention, the determining of the range of pupil sizes is based on a calibration procedure that is performed prior to obtaining the light-intensity information expressing an estimated amount of light energy exposing the at least one eye. The calibration procedure involves selectively illuminating the at least one eye with light of first and second intensities; and registering, for each of the first and second intensities, a respective pupil size of the at least one eye. Based thereon, a mapping function and/or a look-up table is generated, which describes a relationship between the estimated amount of light energy that exposes the at least one eye and an estimated pupil size exhibited by the at least one eye at said estimated amount of light energy. Preferably, the determining of the range of pupil sizes comprises considering the mapping function and/or the look-up table. As a result, it is straightforward to determine an estimated pupil size in any given light condition.

Preferably, the calibration procedure further involves recording a contractive latency, which expresses an interval of time between first and second points in time. At the first point in time, the pupil has an initial size, and the intensity of the illumination is increased from the first intensity to the second intensity. The second point in time is when the pupil has attained a final size while being exposed to the illumination of the second intensity.

Analogously, the calibration procedure further comprises recording a dilative latency, which expresses an interval of time between third and fourth points in time. At the third point in time, the pupil has an initial size, and the intensity of the illumination is decreased from the second intensity to the first intensity. The fourth point in time is when the pupil has attained a final size while being exposed to the illumination of the first intensity. Consequently, the key characteristics of the eye model can be derived quickly and in a manner being minimally annoying to the subject.

According to yet another embodiment of this aspect of the invention, the generating of the mapping function and/or the look-up table further involves estimating a minimum pupil size and/or a maximum pupil size of the at least one eye. This is beneficial, since it sets fix outer boundaries for the range of pupil sizes, and thus delimits the search range.

According to still another embodiment of this aspect of the invention, the method comprises obtaining the light-intensity information via a light sensor arranged in proximity to the at least one eye. For example, the light sensor may be integrated in a pair of glasses worn by the subject. The light sensor is configured to register the estimated amount of light energy that exposes the at least one eye. Thereby, the sensor may provide a basis for an estimated pupil size of the subject.

Alternatively, method may comprise obtaining the light-intensity information via an image signal representing the at least one eye, which image signal expresses an amount of light energy reflected in a surface of the at least one eye. Thus, here, the image conveys the light sensor information, which, in turn, provides a basis for an estimated pupil size of the subject.

As yet another alternative, the method comprises obtaining the light-intensity information via a control signal expressing a luminance of a display arranged to present visual input to the at least one eye. In other words, the light sensor information is acquired indirectly through exposure data. This data is actually available even before the subject's eye is exposed to the light in question. Of course, this is beneficial in terms of determining an appropriate range of pupil sizes at a given point in time.

The range of pupil sizes is preferably determined in consideration of a system delay between a point in time when the control signal is generated and a period during which the visual input is presented to the at least one eye. Consequently, the range of pupil sizes can be adjusted in a manner that is temporally harmonized with the variations of the light that exposes the at least one eye.

According to yet another embodiment of this aspect of the invention, the control signal is based on a recorded video signal. Here, the determining of the range of pupil sizes further comprises determining an extended system delay between a basic point in time and a period during which the visual input is presented to the at least one eye. The presented visual content is generated at a point in time after the basic point in time. In other words, the eyetracker has knowledge about a future light exposure of the at least one eye. The range of pupil sizes is then determined in consideration of the extended system delay. Thereby, the range of pupil sizes can be adjusted in synchronization with the variations of the light that exposes the at least one eye.

According to still another embodiment of this aspect of the invention, the control signal is based on a computer-generated video signal. Also in this case, the determining of the range of pupil sizes further comprises determining an extended system delay between the basic point in time and the period during which an estimated visual input is expected to be presented to the at least one eye, and the estimated visual input is generated at a point in time after the basic point in time. The range of pupil sizes is then determined in consideration of the extended system delay. Again, this renders it possible to synchronize adjustment of the range of pupil sizes with variations of the light that exposes the at least one eye.

According to a further aspect of the invention the object is achieved by a computer program product loadable into a non-volatile data carrier communicatively connected to a processing circuitry. The computer program product contains software configured to, when the computer program product is run on the processing circuitry, cause the processing circuitry to: obtain a digital image representing at least one eye of a subject; search for pupil candidates in the digital image according to a search algorithm; and determine a position for the at least one eye in the digital image based on said search. Specifically, the software is configured to cause the processing circuitry to: obtain light-intensity information expressing an estimated amount of light energy exposing the at least one eye when registering the digital image; and in response to the light-intensity information, determine a range of pupil sizes, which is to be applied by the search algorithm in said search in such a manner that the size of a detected pupil candidate must lie within the range of pupil sizes to be accepted by the search algorithm as a valid pupil of the subject.

According to another aspect of the invention, the object is achieved by a non-volatile data carrier containing such a computer program.

The advantages of this computer program product and non-volatile data carrier are apparent from the discussion above with reference to the method performed in the eyetracker.

According to yet another aspect of the invention, the above object is achieved by an eyetracker containing a processing circuitry, which is configured to: obtain a digital image representing at least one eye of a subject; search for pupil candidates in the digital image according to a search algorithm; and determine a position for the at least one eye in the digital image based on said search. The processing circuitry is also configured to obtain light-intensity information expressing an amount of light energy reaching the at least one eye when registering the digital image. In response to the light-intensity information, the processing circuitry is configured to determine a range of pupil sizes, which is to be applied by the search algorithm in said search in such a manner that the size of a detected pupil candidate must lie within the range of pupil sizes to be accepted by the search algorithm as a valid pupil of the subject.

According to further aspects of the invention, the object is achieved by a headset comprising the proposed eyetracker. Preferably, the headset also contains at least one display that is configured to present visual data to a subject, which visual data represents augmented reality data and/or virtual-reality graphics. The advantages of this eyetracker, headset and eyetracker arrangement, as well as the respective preferred embodiments thereof, are apparent from the discussion above with reference to the proposed method.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
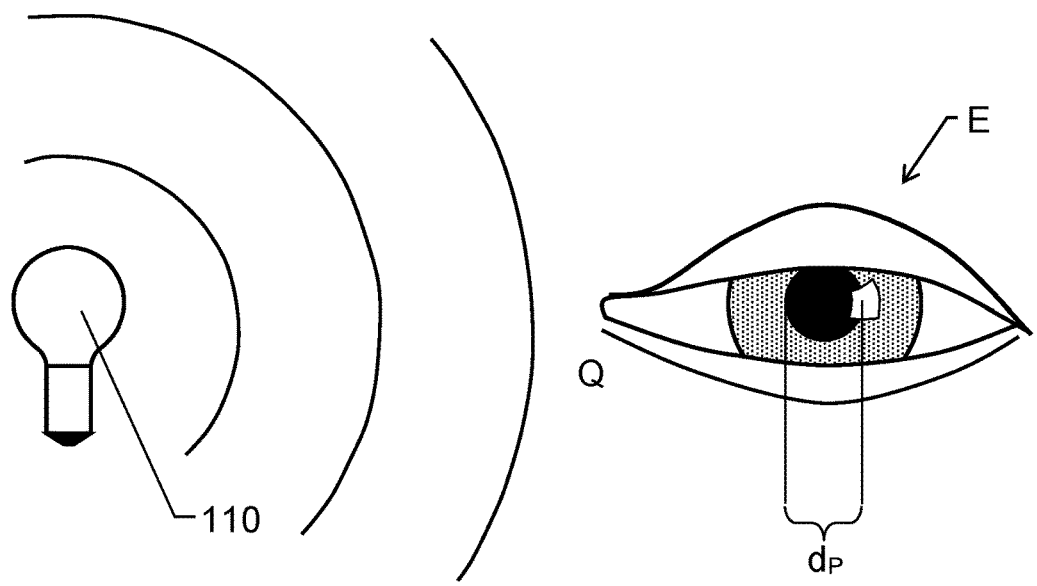
FIG. 1 illustrates, schematically, how an eye of a subject is exposed to light according to one embodiment of the invention.

FIG. 1 schematically shows a subject's eye E, which is located near an active light source 110. Consequently, the eye E is exposed to light of an intensity Q, which causes the eye's pupil to attain a size $d_P$ allowing an appropriate amount of light into the eye E. Since the pupil is arranged to control the input of light into the eye E via adjustment of the pupil size $d_P$, a relatively high light intensity Q generally results in a comparatively small pupil size $d_P$, and vice versa.

Figure 2:
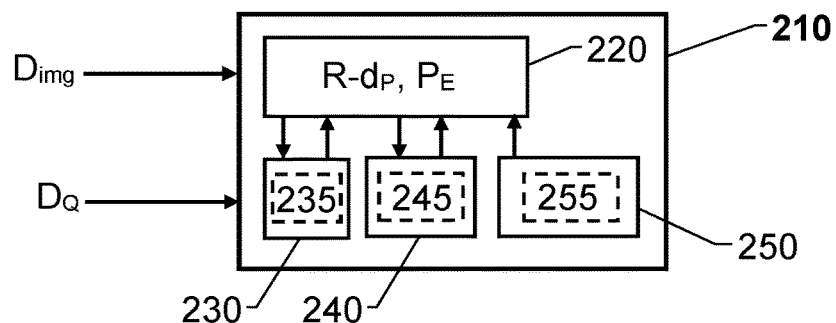
FIG. 2 shows a block diagram over an eyetracker according to one embodiment of the invention.
Figure 3:
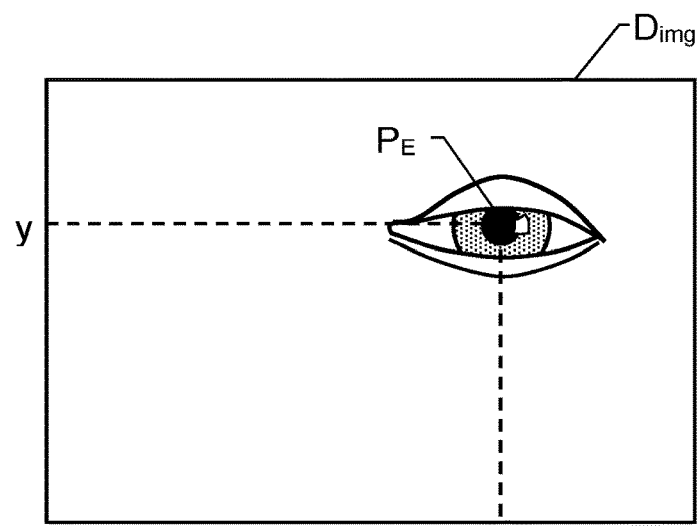
FIG. 3 represents a digital image of an eye of a subject, which digital image is used according to one embodiment of the invention.

FIG. 2 shows a block diagram over an eyetracker 210 according to one embodiment of the invention, and FIG. 3 shows a digital image $D_{img}$ of the eye E.

The eyetracker 210 contains a processing circuitry 220, which is configured to obtain the digital image $D_{img}$ representing at least one eye E of a subject. Typically, the digital image $D_{img}$ represents an image frame registered by a video camera. However, according to the invention, the digital image $D_{img}$ may be registered by any other imaging means, e.g. a still camera.

In any case, the processing circuitry 220 is configured to search for pupil candidates in the digital image $D_{img}$ according to a search algorithm; and based this search, for each of the at least one eye E, determine a respective position $P_E$ in the digital image $D_{img}$. The respective position $P_E$ may be represented by x and y values designating a particular coordinate in the digital image $D_{img}$.

The processing circuitry 220 is further configured to obtain light-intensity information $D_Q$ expressing an amount of light energy Q reaching the eye E when registering the digital image $D_{img}$.

Figure 6:
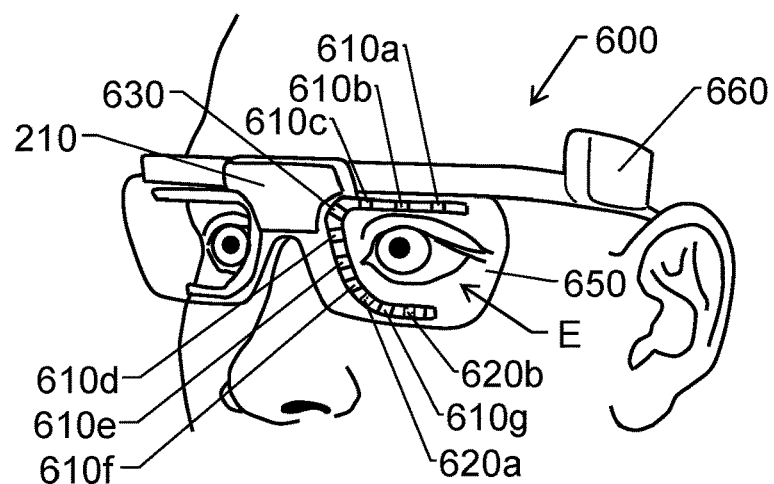
FIG. 6 shows a headset according to one embodiment of the invention.

The light-intensity information $D_Q$ may be obtained via a light sensor arranged in proximity to the eye E (see e.g. 630 in FIG. 6). The light sensor is configured to register the estimated amount of light energy Q that exposes the eye E. The light energy Q, in turn, may originate from ambient light and/or from a display presenting image data to the subject.

Alternatively, the light-intensity information $D_Q$ may be obtained via an image signal representing the eye E, e.g. a video sequence. Thus, in addition to reproducing the appearance of the eye E, the image signal indicates an amount of light energy reflected in a surface of the at least one eye E, for example by means of pixel values in the image data that reproduces the eye E.

Figure 7:
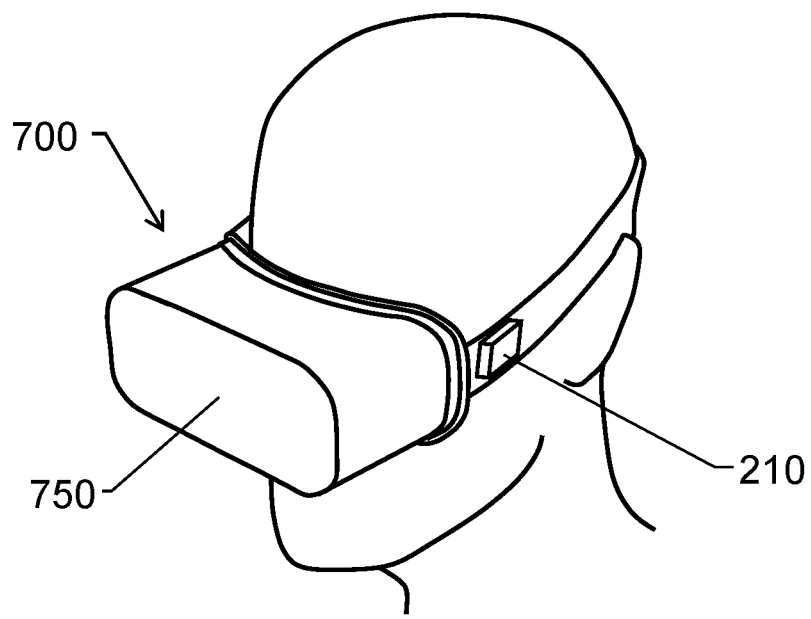
FIG. 7 shows a headset according to another embodiment of the invention.
Figure 8:
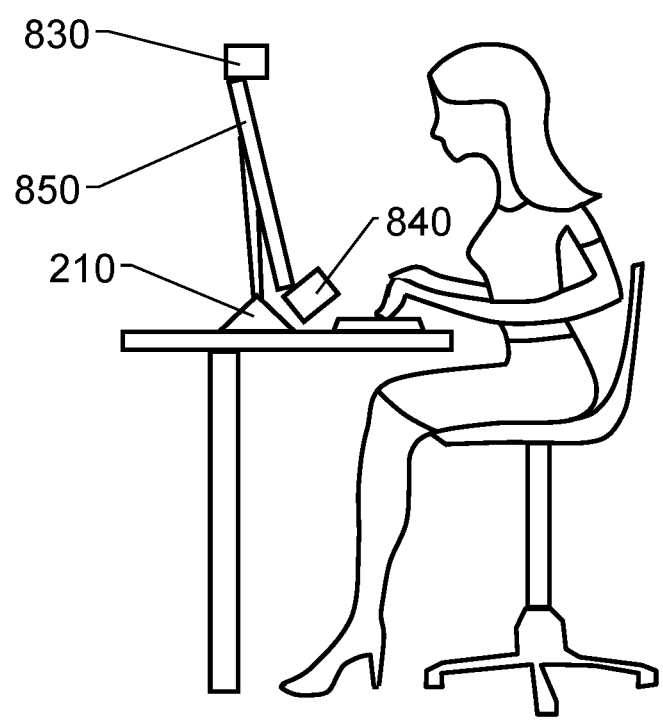
FIG. 8 shows an eyetracker arrangement configured to present visual information to a subject via a display being physically separated from the subject according to one embodiment of the invention.

As yet another alternative, the light-intensity information $D_Q$ may be obtained via a control signal expressing a luminance L of a display 650, 750 and/or 850 arranged to present visual input to the eye E (see FIGS. 6, 7 and 8). Namely, if a display 650, 750 or 850 respectively is located near the eye E and the display 650, 750 or 850 presents image data, the luminance L of that image data will be highly correlated with the subject's pupil behavior. More precisely, if image data of high luminance L is presented, the pupil size $d_P$ is expected to be relatively small, and if image data of low luminance L is presented, the pupil size $d_P$ is expected to be relatively large.

Nevertheless, in response to the light-intensity information $D_Q$, the processing circuitry 220 is configured to determine a range of pupil sizes R-$d_P$. The range of pupil sizes R-$d_P$ is applied by the search algorithm in the search in such a manner that the size of a detected pupil candidate must lie within the range of pupil sizes R-$d_P$ to be accepted by the search algorithm as a valid pupil of the subject.

Preferably, the range of pupil sizes R-$d_P$ is determined by using an eye model that defines the range of pupil sizes R-$d_P$ based on the light-intensity information $D_Q$. For example, the eye model that defines the range of pupil sizes R-$d_P$ may be based on one or more parameters describing a pupil behavior in response to variations in the estimated amount of light energy Q that exposes the eye E. A first parameter may here describe the process according to which the pupil diameter $d_P$ contracts when the eye E is subjected to an increased amount of light energy Q, and a second parameter may describe the process according to which the pupil diameter $d_P$ expands when the amount of light energy Q exposing the eye E is decreased.

According to one alternative aspect of the invention, a detected pupil candidate must not necessarily lie within the range of pupil sizes R-$d_P$ to be accepted by the search algorithm as a valid pupil of the subject. According to this aspect of the invention, the range of pupil sizes R-$d_P$ instead constitutes one soft decision criterion among one or more other soft decision criteria. Here, if for example the estimated amount of light energy Q is relatively high and therefore the range of pupil sizes R-$d_P$ defines a comparatively small largest acceptable pupil, a large pupil candidate (whose size is outside the range R-$d_P$) can still be accepted if one or more of the other soft decision criteria provide convincing bases for accepting this candidate.

Figure 4:
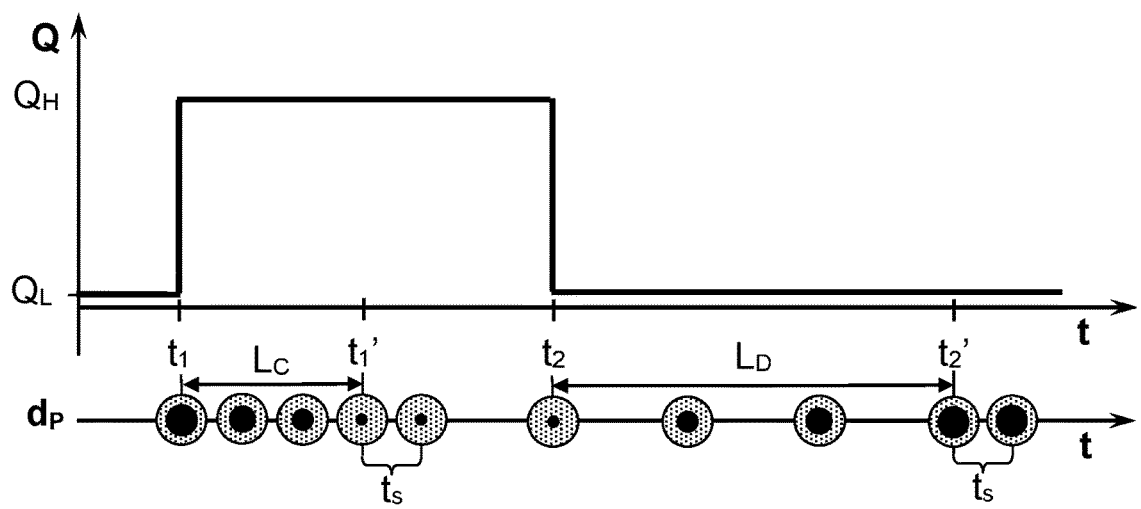
FIG. 4 shows a diagram exemplifying a calibration procedure according to one embodiment of the invention, wherein an eye of a subject is selectively illuminated by light of first and second intensities.

FIG. 4 shows a diagram exemplifying a calibration procedure according to one embodiment of the invention. The diagram reflects light intensity Q along the vertical axis and time t along the horizontal axis.

The calibration procedure is performed prior to determining the range of pupil sizes R-$d_P$ in steady-state operation of an eye-tracker aiming at identifying a subject's pupil. The calibration procedure involves selectively illuminating the eye E of a subject with light of first and second intensities $Q_L$ and $Q_H$ respectively. For each of the first and second intensities $Q_L$ and $Q_H$ respectively, a pupil size $d_P$ of the eye E is registered. Based thereon a mapping function is generated, which describes a relationship between the estimated amount of light energy Q that exposes the eye E and an estimated pupil size exhibited by the eye E at this estimated amount of light energy Q. Alternatively, or in addition thereto, a look-up table may be generated to represent the relationship between the estimated amount of light energy Q exposing the eye E and the estimated pupil size exhibited by the eye E at said estimated amount of light energy Q.

FIG. 2 shows a first memory circuit 230 storing the mapping function 235 and a second memory circuit 240 storing the look-up table 245. The processing circuit 220 is preferably configured to generate at least one the mapping function 235 and the look-up table 245 via a calibration procedure, for example as described below. Then, in steady state operation, processing circuit 220 is configured to use the mapping function 235 and/or the look-up table 245 to derive the range of pupil sizes R-$d_P$.

According to embodiments of the invention, the calibration procedure involves recording a contractive latency $L_C$ and/or a dilative latency $L_D$, i.e. the time it takes for the eye E to adapt to an increased and a decreased light intensity respectively.

The contractive latency $L_C$ expresses an interval of time between first and second points in time $t_1$ and $t_1'$. At the first point in time $t_1$, the pupil has an initial size $d_P$, which is presumed to be relatively large. Preferably, at the first point in time $t_1$ the eye E is exposed to light of the first intensity $Q_L$ being so low that the pupil size $d_P$ is at least close to its largest possible diameter. At the first point in time $t_1$, the intensity of the illumination is increased from the first intensity $Q_L$ to the second intensity $Q_H$. As a result, the pupil size $d_P$ starts to decrease. The second point in time $t_1'$ is when the pupil has attained a final size while being exposed to the illumination of the second intensity $Q_H$. In other words, the eye E has adapted fully to the changed light conditions at the second point in time $t_1'$. For example, this can be concluded after a probe period $t_s$ during which the pupil size $d_P$ has remained unchanged.

Analogously, the dilative latency $L_D$ expresses an interval of time between third and fourth points in time $t_2$ and $t_2'$. At the third point in time $t_2$, the pupil has an initial size $d_P$, which is presumed to be relatively small. Preferably, at the third point in time $t_2$, the pupil size $d_P$ is at least close to its smallest possible diameter. At the third point in time $t_2$, the intensity of the illumination is decreased from the second intensity $Q_H$ to the first intensity $Q_L$. As a result, the pupil size $d_P$ starts to increase. This process is typically somewhat slower than the contraction process, which is symbolically reflected in FIG. 4. At the fourth point in time $t_2'$, the pupil has attained a final size while being exposed to the illumination of the first intensity $Q_L$. I.e. the eye E has adapted fully to the changed light conditions. This can for example be concluded after the probe period $t_s$ during which the pupil size $d_P$ has remained unchanged.

According to embodiments of the invention, the mapping function 235 and/or the look-up table 245 are further generated such that they contain an estimation of a minimum pupil size and/or a maximum pupil size of the eye E. Preferably, such estimations are based on the above-described calibration procedure, which can be carried out at an initial stage when a subject starts using an eyetracker.

In steady state operation, the processing circuitry 220 is preferably configured to determine the range R-$d_P$ of pupil sizes by considering the mapping function 235 and/or the look-up table 245. Namely, thereby, since due to the calibration procedure, these resources provide a solid basis for determining the range R-$d_P$ of pupil sizes accurately over a broad range of light intensity Q.

Preferably, the contractive and dilative latencies $L_C$ and $L_D$ are defined with tolerances. This means that, in practice, the processing circuitry 220 accepts some variations around nominal values for the contractive and dilative latencies $L_C$ and $L_D$ respectively. These variations, in turn, may be described by one or two additional parameters of the algorithm applied by the processing circuitry 220.

Figure 5:
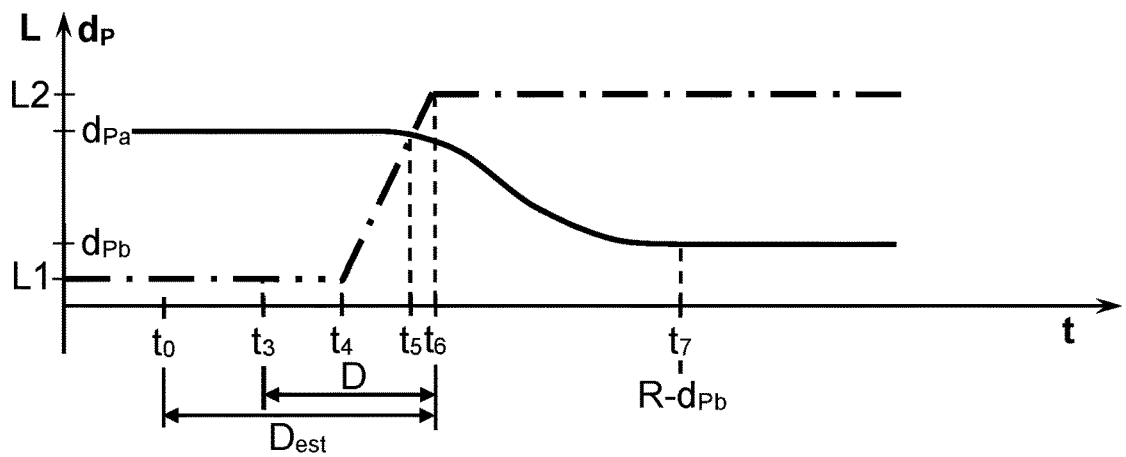
FIG. 5 shows a diagram exemplifying how the luminance of a display is varied over time, and, as a result, the pupil size of a subject who regards the display changes.

FIG. 5 shows a diagram exemplifying how the luminance L of a display is varied over time t. The diagram in FIG. 5 also illustrates how the pupil size $d_P$ of a subject who is regarding the display changes as a result of the varying luminance L.

In order to adjust the range R-$d_P$ of pupil sizes in a manner that is temporally harmonized with the variations in the intensity of the light that exposes the eye E, in steady state operation of the eyetracker, the range of pupil sizes R-$d_P$ is preferably determined consideration of a system delay D. The system delay D represents the period between a point in time $t_3$ when the control signal is generated and a period $t_4$ to $t_6$ during which the visual input is presented to the eye E.

In this example, we assume that the control signal causes the luminance L of the display to start to increase at $t_4$. This increase continues linearly until $t_6$. At a point in time $t_5$ between $t_4$ and $t_6$, the eye's E pupil size $d_P$ begins to decrease in response to the increased display luminance L, and at a yet later point in time $t_7$, after $t_6$, the pupil size $d_P$ has attained a diameter $d_{Pb}$.

Based on information about the luminance L and the above-referenced calibration procedure, for example captured by the mapping function 235 and/or the look-up table 245, the processing circuitry 220 is configured to assign a range R-$d_{Pb}$ of pupil sizes, which includes the pupil size $d_{Pb}$. Consequently, the eyetracking algorithm will be able to identify the subject's eye E in the image data $D_{img}$ in a straightforward manner.

In one embodiment of the invention, the control signal of FIG. 5 is based on a recorded video signal. The determining of the range of pupil sizes R-$d_P$ further involves determining an extended system delay $D_{est}$. The extended system delay $D_{est}$ represents the period between a basic point in time $t_0$ and the period $t_4$ to $t_6$ during which the visual input is presented to the eye E. Here, the presented visual content is generated at a point in time $t_3$ after the basic point in time $t_0$. In other words, at the basic point in time $t_0$, the control signal in response to which the visual content is to be presented has not yet been generated. However, since the visual content originates from a recorded video signal it is possible to have knowledge about such a future control signal. The range of pupil sizes R-$d_P$ can therefore be determined in consideration of the extended system delay $D_{est}$. This means that the processing circuitry 220 may be given sufficient time to determine the range of pupil sizes R-$d_P$ so that this range is adjusted in synchronization with the variations of the light that exposes the eye E.

In another embodiment of the invention, the control signal of FIG. 5 is instead based on a computer-generated video signal, for instance representing a video game environment or a computer simulated 3D model. Also here, the determining of the range of pupil sizes R-$d_P$ further involves determining the extended system delay $D_{est}$ between the basic point in time $t_0$ and the period $t_4$ to $t_6$ during which an estimated visual input is expected to be presented to the at least one eye E. Similar to the above, the estimated visual input is also generated at a point in time $t_3$ after the basic point in time $t_0$. Although a future control signal cannot be known exactly as if it were based on a recorded video signal, it is still possible determine the range of pupil sizes R-$d_P$ in consideration of the extended system delay $D_{est}$ also here. Namely, given a current scene being represented by the computer-generated video signal at the basic point in time $t_0$, the control signal at the point in time $t_3$ can be estimated with fairly high accuracy due the constrains set by the graphic environment. For example, an avatar in a first-person game can only move and/or rotate its field of view by a limited amount between $t_0$ and $t_3$.

FIG. 6 shows a headset 600, which either lacks a display or includes a display 650 that is configured to present visual input to the eye E of a subject. In the former case, the headset 600 is exclusively adapted to track the subject's eye movements and/or gaze position. In the latter case, the headset 600 may be configured to present visual data representing an augmented reality to the subject.

In any case, the headset 600 contains illuminators 610a, 610b, 610c, 610d, 610e, 610f and 610g configured to create a pattern of light on the eye E, cameras 620a and 620b configured to register image data $D_{img}$ representing the eye E and a battery configured to power the headset 600 with electric energy. The headset 600 also contains the proposed eyetracker 210, which is configured to determine a range of pupil sizes R-$d_P$ as described above. Further, the headset may contain a light sensor 630 configured to register the estimated amount of light energy Q that exposes the eye E.

FIG. 7 shows another headset 700, which is configured to present virtual-reality graphics to a subject according to one embodiment of the invention. The headset 700 may contain a light sensor (not shown) configured to register the estimated amount of light energy Q that exposes at least one the eye of the subject and a display 750 configured to present visual input to the at least one the eye. Alternatively, the light-intensity information $D_Q$ may be obtained via a control signal expressing a luminance L of the display 750 arranged to present visual input to the eye E. Since the display 750 is located near the eye E, and the display 750 and the eye E are in a closed environment, without or with a small amount of ambient light, the luminance L of that image data will be highly correlated with the subject's pupil behavior. The headset 700 also contains the proposed eyetracker 210, which is configured to determine a range of pupil sizes R-$d_P$ as described above.

FIG. 8 shows an eyetracker arrangement configured to present visual information to a subject via a display 850 being physically separated from the subject according to one embodiment of the invention.

Here, a light sensor 830 may be configured to register an estimated amount of light energy Q that exposes at least one eye of the subject. A camera-illuminator unit 840 is configured to create a pattern of light on at least one eye of the subject and register image data $D_{img}$ representing the at least one eye. The eyetracker arrangement also contains an eyetracker 210, which is configured to determine a range of pupil sizes R-$d_P$ as described above.

Figure 9:
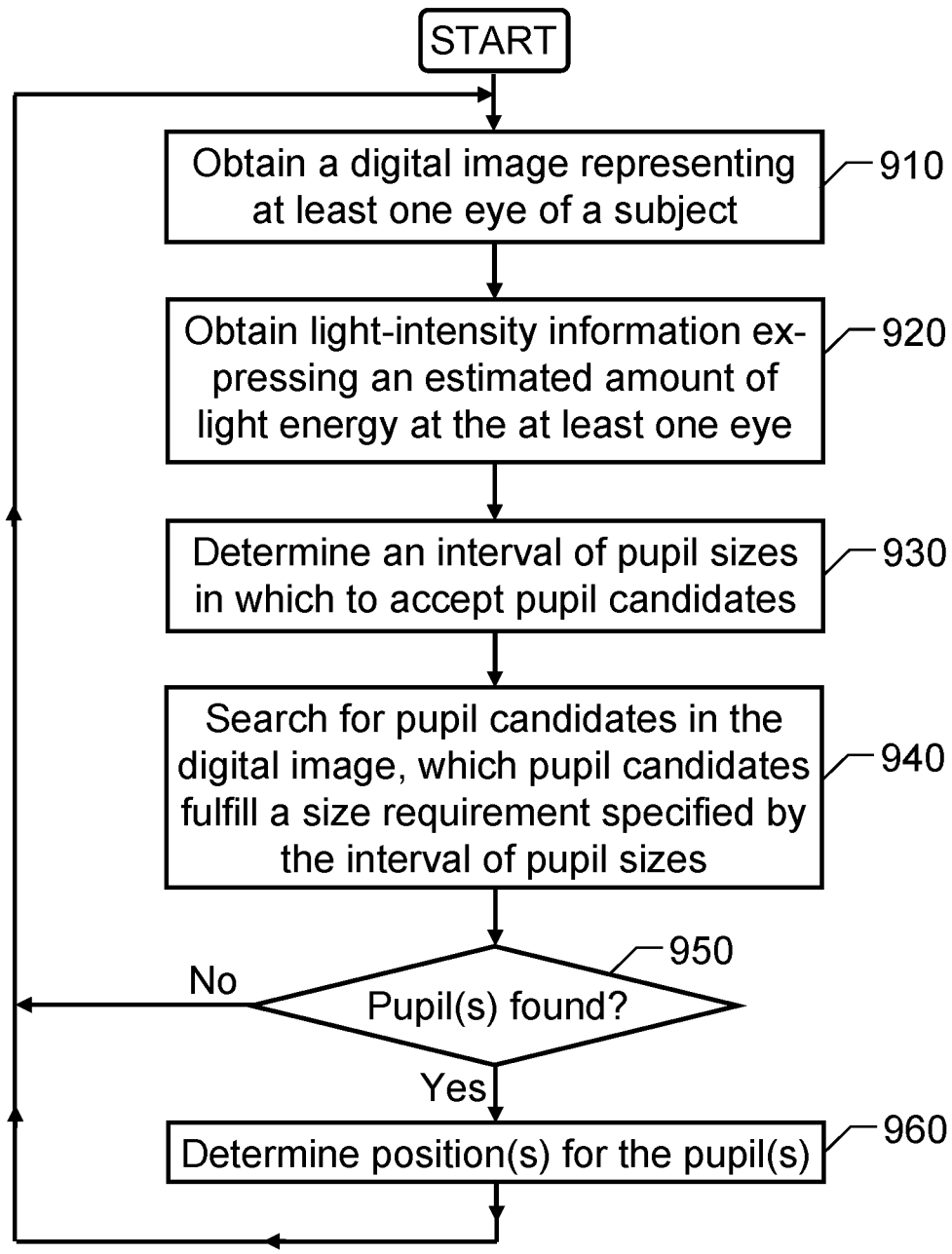
FIG. 9 illustrates, by means of a flow diagram, the general method according to the invention.

In order to sum up, and with reference to the flow diagram in FIG. 9, we will now describe the general method performed in the eyetracker according to the invention.

A first step 910, a digital image is obtained, which digital image represents at least one eye of a subject. Thereafter, in a step 920, light-intensity information obtained, which light-intensity information expresses an estimated amount of light energy exposing the at least one eye when registering the digital image. In a subsequent step 930, an range of pupil sizes is determined.

In a following step 940, a search algorithm searches for pupil candidates in the digital image. The search algorithm applies the range of pupil sizes in such a manner that the size of a detected pupil candidate must lie within the range of pupil sizes in order to be accepted by the search algorithm as a valid pupil of the subject.

Then, in a step 950, it is checked if the search algorithm has found at least one valid pupil of the subject. If so, a step 960 follows; and otherwise, the procedure loops back to step 910.

In step 960, based on the searching, a respective position for the at least one eye is determined in the digital image. Thereafter, the procedure loops back to step 910.

All of the process steps, as well as any sub-sequence of steps, described with reference to FIG. 9 above may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Below follows a set of numbered clauses that define an eyetracker according to one aspect of the invention.

Numbered clause 1: An eyetracker (210) comprising a processing circuitry (220) configured to:
  obtain a digital image ($D_{img}$) representing at least one eye (E) of a subject,
  search for pupil candidates in the digital image ($D_{img}$) according to a search algorithm, and
  determine a position ($P_E$) for the at least one eye (E) in the digital image ($D_{img}$) based on said search,
wherein the processing circuitry (220) is further configured to:
  obtain light-intensity information ($D_Q$) expressing an amount of light energy (Q) reaching the at least one eye (E) when registering the digital image ($D_{img}$), and in response to the light-intensity information ($D_Q$), and determine a range of pupil sizes (R-$d_P$), which range of pupil sizes (R-$d_P$) is to be applied by the search algorithm in said search in such a manner that the size of a detected pupil candidate must lie within the range of pupil sizes (R-$d_P$) to be accepted by the search algorithm as a valid pupil of the subject.

Numbered clause 2: The eyetracker according to the numbered clause 1, wherein the processing circuitry (220) is configured to determine the range of pupil sizes (R-$d_P$) by using an eye model that defines the range of pupil sizes (R-$d_P$) based on the light-intensity information ($D_Q$).

Numbered clause 3: The eyetracker according to the numbered clause 2, wherein the eye model that defines the range of pupil sizes (R-$d_P$) is further based on at least one parameter describing a pupil behavior in response to variations in the estimated amount of light energy (Q) exposing the at least one eye (E).

Numbered clause 4: The eyetracker (210) according to any one of the numbered clauses 1 to 3, wherein, prior to obtaining the light-intensity information ($D_Q$) expressing an estimated amount of light energy (Q) exposing the at least one eye (E), the processing circuitry (220) is configured to execute a calibration procedure comprising:
  selectively illuminating the at least one eye (E) with light of first and second intensities ($Q_L$, $Q_H$),
  registering, for each of the first and second intensities ($Q_L$, $Q_H$), a pupil size ($d_P$) of the at least one eye (E), and based thereon
  generating at least one of a mapping function (235) and a look-up table (245) describing a relationship between an estimated amount of light energy (Q) that reaches the at least one eye (E) and an estimated pupil size exhibited by the at least one eye (E) at said estimated amount of light energy (Q).

Numbered clause 5: The eyetracker (210) according to the numbered clause 4, wherein in the calibration procedure, the processing circuitry (220) is further configured to record a contractive latency ($L_C$) expressing an interval of time between:
  a first point in time ($t_1$) when the pupil has an initial size, and the intensity of the illumination is increased from the first intensity ($Q_L$) to the second intensity ($Q_H$); and
  a second point in time ($t_1'$) when the pupil has attained a final size while being exposed to the illumination of the second intensity ($Q_H$).

Numbered clause 6: The eyetracker (210) according to any one of the numbered clauses 4 or 5, wherein in the calibration procedure, the processing circuitry (220) is further configured to record a dilative latency ($L_D$) expressing an interval of time between:
  a first point in time ($t_2$) when the pupil has an initial size, and the intensity of the illumination is decreased from the second intensity ($Q_H$) to the first intensity ($Q_L$); and
  a second point in time ($t_2'$) when the pupil has attained a final size while being exposed to the illumination of the first intensity ($Q_L$).

Numbered clause 7: The eyetracker (210) according to any one of the numbered clauses 2 to 6, wherein the processing circuitry (220) is further configured to estimate at least one of a minimum pupil size and a maximum pupil size of the at least one eye (E) when generating the at least one of the mapping function (235) and the look-up table (245).

Numbered clause 8: The eyetracker (210) according to any one of the numbered clauses 3 to 7, wherein the processing circuitry (220) is configured to determine the range (R-$d_P$) of pupil sizes in consideration of considering the at least one of the mapping function (235) and the look-up table (245).

Numbered clause 9: The eyetracker (210) according to any one of the numbered clauses 1 to 8, comprising:
  obtaining the light-intensity information ($D_Q$) via a light sensor (630) arranged in proximity to the at least one eye (E), which light sensor (630) is configured to register an amount of light energy (Q) that reaches the at least one eye (E).

Numbered clause 10: The eyetracker (210) according to any one of the numbered clauses 1 to 8, wherein the processing circuitry (220) is configured to:
  obtain the light-intensity information ($D_Q$) via an image signal representing the at least one eye (E), which image signal expresses an amount of light energy reflected in a surface of the at least one eye (E).

Numbered clause 11: The eyetracker (210) according to any one of the numbered clauses 1 to 8, wherein the processing circuitry (220) is configured to:
  obtain the light-intensity information ($D_Q$) via a control signal expressing a luminance (L) of a display (650, 750, 850) arranged to present visual input to the at least one eye (E).

Numbered clause 12: The eyetracker (210) according to the numbered clauses 11, wherein the processing circuitry (220) is further configured to:
  determine the range of pupil sizes (R-$d_P$) in consideration of a system delay (D) between a point in time ($t_3$) when the control signal is generated and a period ($t_4$ to $t_6$) during which the visual input is presented to the at least one eye (E).

Numbered clause 13: The eyetracker (210) according to the numbered clause 11, wherein the control signal is based on a recorded video signal, and the processing circuitry (220) is further configured to:
  determine an extended system delay ($D_{est}$) between a basic point in time ($t_0$) and a period ($t_4$ to $t_6$) during which the visual input is presented to the at least one eye (E), the presented visual content being generated at a point in time ($t_3$) after the basic point in time ($t_0$), and
  determine the range of pupil sizes (R-$d_P$) in consideration of the extended system delay ($D_{est}$).

Numbered clause 14: The eyetracker (210) according to the numbered clause 11, wherein the control signal is based on a computer-generated video signal, and the processing circuitry (220) is further configured to:
  determine an extended system delay ($D_{est}$) between a basic point in time ($t_0$) and period presented ($t_4$ to $t_6$) during which an estimated visual input is expected to be presented to the at least one eye (E), the estimated visual input being generated at a point in time ($t_3$) after the basic point in time ($t_0$), and
  determine the range of pupil sizes (R-$d_P$) in consideration of the extended system delay ($D_{est}$).

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method performed in an eyetracker, the method comprising:

obtaining a digital image representing at least one eye of a subject, searching for pupil candidates in the digital image according to a search algorithm, and determining a position for the at least one eye in the digital image based on said searching, characterized by:

obtaining light-intensity information expressing an estimated amount of light energy exposing the at least one eye when registering the digital image, and in response to the light-intensity information determining a range of pupil sizes, which range of pupil sizes is to be applied by the search algorithm in said searching in such a manner that the size of a detected pupil candidate must lie within the range of pupil sizes to be accepted by the search algorithm as a valid pupil of the subject.

2. The method according to claim 1, wherein the determining of the range of pupil sizes comprises using an eye model that defines the range of pupil sizes based on the light-intensity information.

3. The method according to claim 2, wherein the eye model that defines the range of pupil sizes is further based on at least one parameter describing a pupil behavior in response to variations in the estimated amount of light energy exposing the at least one eye.

4. The method according to claim 1, wherein the determining of the range of pupil sizes is based on a calibration procedure performed prior to obtaining the light-intensity information expressing an estimated amount of light energy exposing the at least one eye, the calibration procedure comprising:

selectively illuminating the at least one eye with light of first and second intensities, registering, for each of the first and second intensities, a pupil size of the at least one eye, and based thereon generating at least one of a mapping function and a look-up table describing a relationship between the estimated amount of light energy that exposes the at least one eye and an estimated pupil size exhibited by the at least one eye at said estimated amount of light energy.

5. The method according to claim 4, wherein the calibration procedure further comprises recording a contractive latency expressing an interval of time between:

a first point in time when the pupil has an initial size, and the intensity of the illumination is increased from the first intensity to the second intensity; and a second point in time when the pupil has attained a final size while being exposed to the illumination of the second intensity.

6. The method according to claim 4, wherein the calibration procedure further comprises recording a dilative latency expressing an interval of time between:

a third point in time when the pupil has an initial size, and the intensity of the illumination is decreased from the second intensity to the first intensity; and a fourth point in time when the pupil has attained a final size while being exposed to the illumination of the first intensity.

7. The method according to claim 4, wherein the generating of the at least one of the mapping function and the look-up table further comprises estimating at least one of a minimum pupil size and a maximum pupil size of the at least one eye.

8. The method according to claim 4, wherein the determining of the range of pupil sizes comprises considering at least one of the mapping function and the look-up table.

9. The method according to claim 1, comprising:

obtaining the light-intensity information via a light sensor arranged in proximity to the at least one eye, which light sensor is configured to register the estimated amount of light energy that exposes the at least one eye.

10. The method according to claim 1, comprising:

obtaining the light-intensity information via an image signal representing the at least one eye, which image signal expresses an amount of light energy reflected in a surface of the at least one eye.

11. The method according to claim 1, comprising:

obtaining the light-intensity information via a control signal expressing a luminance of a display arranged to present visual input to the at least one eye.

12. The method according to claim 11, further comprising:

determining the range of pupil sizes in consideration of a system delay between a point in time when the control signal is generated and a period during which the visual input is presented to the at least one eye.

13. The method according to claim 11, wherein the control signal is based on a recorded video signal and the determining of the range of pupil sizes further comprises:

determining an extended system delay between a basic point in time and a period during which the visual input is presented to the at least one eye, the presented visual content being generated at a point in time after the basic point in time, and determining the range of pupil sizes in consideration of the extended system delay.

14. The method according to claim 11, wherein the control signal is based on a computer-generated video signal and the determining of the range of pupil sizes further comprises:

determining an extended system delay between a basic point in time and a period during which an estimated visual input is expected to be presented to the at least one eye, the estimated visual input being generated at a point in time after the basic point in time, and determining the range of pupil sizes in consideration of the extended system delay.

15. A computer program product loadable into a non-volatile data carrier communicatively connected to a processing circuitry, the computer program product comprising software configured to, when the computer program product is run on the processing circuitry, cause the processing circuitry to:

obtain a digital image representing at least one eye of a subject, search for pupil candidates in the digital image according to a search algorithm, and determine a position for the at least one eye in the digital image based on said search, characterized in that when the computer program product is run on the processing circuitry, the software is further configured to cause the processing circuitry to:

obtain light-intensity information expressing an estimated amount of light energy exposing the at least one eye when registering the digital image, and in response to the light-intensity information determine a range of pupil sizes, which range of pupil sizes is to be applied by the search algorithm in said search in such a manner that the size of a detected pupil candidate must lie within the range of pupil sizes to be accepted by the search algorithm as a valid pupil of the subject.

16. A non-volatile data carrier containing the computer program product of the claim 15.

17. An eyetracker comprising a processing circuitry configured to:
  obtain a digital image representing at least one eye of a subject,
  search for pupil candidates in the digital image according to a search algorithm, and
  determine a position for the at least one eye in the digital image based on said search,
characterized in that processing circuitry is further configured to:
  obtain light-intensity information expressing an amount of light energy reaching the at least one eye when registering the digital image, and in response to the light-intensity information, and
  determine a range of pupil sizes, which range of pupil sizes is to be applied by the search algorithm in said search in such a manner that the size of a detected pupil candidate must lie within the range of pupil sizes to be accepted by the search algorithm as a valid pupil of the subject.

18. A headset, characterized in that the headset comprises the eyetracker according to claim 17.

19. The headset according to claim 18, further comprising at least one display configured to present visual data to a subject, which visual data represents at least one of augmented reality data and virtual-reality graphics.

20. An eyetracker arrangement configured to present visual information to a subject via a display being physically separated from the subject, characterized in that the eyetracker arrangement comprises the eyetracker according to claim 17.

* * * * *